United States Patent [19]

Danieau

[11] Patent Number: 4,907,497
[45] Date of Patent: Mar. 13, 1990

[54] RIGID DEVICE FOR INSTALLATION OF HEATING AND/OR AIR CONDITIONING IN AN AUTOMOBILE

[75] Inventor: Jacques Danieau, Noisy-le-Roi, France

[73] Assignee: Valeo, Paris, France

[21] Appl. No.: 228,126

[22] Filed: Aug. 4, 1988

[51] Int. Cl.4 ............................................. B60H 1/26
[52] U.S. Cl. .............................. 98/2.08; 237/12.3 A; 237/12.3 B
[58] Field of Search ............... 98/2, 2.08; 180/90; 237/12.3 R, 12.3 A, 12.3 B

[56] References Cited

U.S. PATENT DOCUMENTS

| | | | |
|---|---|---|---|
| 4,223,754 | 9/1980 | Mizuno et al. | 180/90 |
| 4,475,445 | 10/1984 | Dietzsch et al. | 98/2.08 X |
| 4,768,708 | 9/1988 | Klein | 237/12.3 A X |

FOREIGN PATENT DOCUMENTS

| | | | |
|---|---|---|---|
| 0108522 | 10/1912 | European Pat. Off. | |
| 0091618 | 3/1983 | European Pat. Off. | |
| 2259652 | 6/1973 | Fed. Rep. of Germany | 98/2 |
| 2230775 | 5/1981 | Fed. Rep. of Germany | 98/2 |
| 3143503 | 9/1982 | Fed. Rep. of Germany | |
| 3323176 | 1/1985 | Fed. Rep. of Germany | 98/2.08 |
| 3529940 | 2/1987 | Fed. Rep. of Germany | 98/2 |
| 1439055 | 12/1966 | France | |
| 120513 | 7/1984 | Japan | 98/2 |
| 18414 | 1/1985 | Japan | 98/2 |

*Primary Examiner*—Harold Joyce
*Attorney, Agent, or Firm*—Dennison, Meserole, Pollack & Scheiner

[57] ABSTRACT

The device, its components connected together in a rigid manner and as a unit, comprises a housing containing components for the treatment of air (fan, radiator, mixing and distribution shutters), median outlets (6) and lateral outlets (8) for discharge of the air into the passenger space, outlets (10) for discharge of the air onto the windshield, and rigid ducting arrangements (5, 7, 9) conducting the air from the treatment components to the discharge outlets. This device simplifies the mounting of the heating installation in the assembly line of construction of the vehicle, and can also support other elements, i.e., the instruments of the dashboard, controls, connectors, connection wires, and the like.

4 Claims, 2 Drawing Sheets

RIGID DEVICE FOR INSTALLATION OF HEATING AND/OR AIR CONDITIONING IN AN AUTOMOBILE

BACKGROUND OF THE INVENTION

The invention concerns a device for the arrangement of the heating and/or air conditioning installation in the passenger space of an automobile.

FR-A-2,473,430, shows a device which comprises a housing containing components for the treatment of the air to be transmitted to a first series of discharge outlets directed toward the passenger space and to a second series of discharge outlets directed onto the windshield, with one part of the first series of discharge outlets being connected rigidly and in one single block with the housing. In this housing, the components for treatment of the air are particularly a fan, a radiator for heating the air and shutters for both mixing and distribution of the air.

This known device does not include discharge outlets coming into the lateral areas of the passenger space, nor does it have discharge outlets directed toward the windshield for the deicing and defrosting of the windshield.

Therefore it is necessary to provide such outlets on other components of the vehicle, such as, for instance, on the dashboard.

Thus, after assembly and mounting of the device and the dashboard on the vehicle, the outlets which are arranged on the dashboard must be connected to the device by flexible ducting arrangements, and this must occur during assembly line fabrication of the vehicle.

This handling stage is long and difficult because the flexible ducting arrangements are often difficult to fit into place as a result of the lack of available space between the device and the dashboard.

Besides, because of their flexibility, the ducting arrangements can be in contact with certain elements of the vehicle so that, during operation of said vehicle, said contact can be the source of repeated impact shocks to said ducting arrangements when they engage against said elements, thus generating noises which are disturbing to the comfort of the driver.

Moreover, as a result of these repeated shocks, the flexible ducting arrangements can eventually be pierced and thus lose a part of their capacity to perform properly while also inhibiting effective operation of the installation.

SUMMARY OF THE INVENTION

The object of the invention is to remedy the above drawbacks and to simplify the assembly and mounting of the installation for heating and/or air conditioning of the vehicle, while allowing for a guarantee of the good operation of the installation including avoidance of vibrations.

This result is obtained according to the invention in that the device of the invention, the components of which are connected in a rigid manner and formed as a unit with the housing, also comprises other first discharge outlets which are intended to come into the lateral areas of the passenger space, and second series of discharge outlets and means for ducting the air within said housing to said outlets, the assembly thus formed is rigid and formed as a unit for installation as a unit or one single block.

The device, according to the invention, extends over the greater part of the width of the passenger space of the vehicle.

By virtue of the rigidity of the assembly, the device can also act as a support for other elements of the vehicle.

Thus, the device can comprise fixation means for structural finishing elements for the vehicle, for instance the dashboard and the panel.

It is also possible to provide that the device serve to support dashboard instruments and components for control of the vehicle electrical conductors and/or connection wires for those instruments as well as any other elements which may be arranged on or in the vicinity of the device and/or the dashboard.

Thus, the aesthetic quality of one single basic vehicle can be varied as time goes by by changing the structural finishing elements, and/or the equipment of the dashboard can vary from one model to another within a certain range, without affecting either the device or its mounting.

Other characteristics and advantages of the invention will be noted from the detailed description found hereinafter and from the attached drawings, in which:

BRIEF DESCRIPTION OF DRAWINGS

The device shown in FIGS. 1 and 2 and that shown in FIG. 3 differ from each other only in the details of construction and their elements are designated by the same reference numbers. The description hereinafter applies to both embodiments.

DESCRIPTION OF PREFERRED EMBODIMENTS

Figure 1:
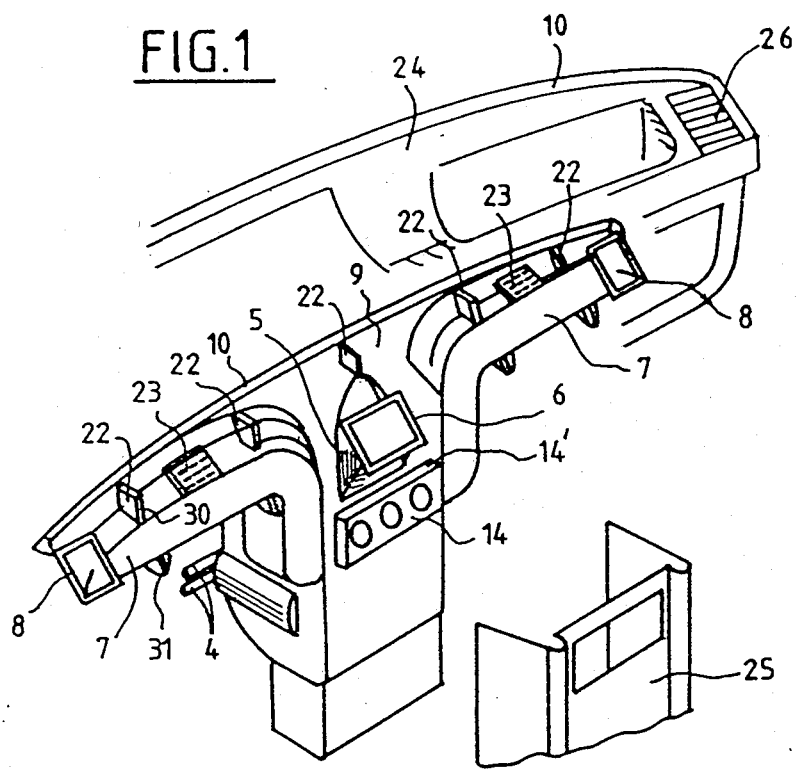
FIG. 1 is a perspective view of a device according to the invention, as viewed from the passenger space of the vehicle, with the structural finishing elements to be affixed on the device being only partially represented.
Figure 2:
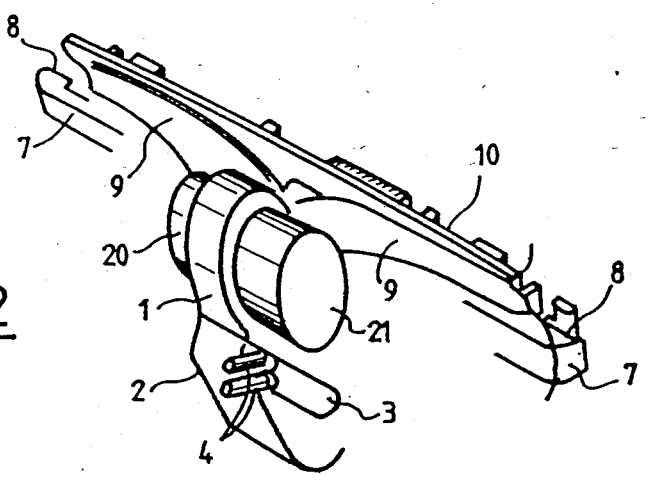
FIG. 2 is a perspective view of the device of FIG. 1, as viewed from the engine compartment of the vehicle.

The device comprises a housing having a top area 1 containing a fan (not shown) and a bottom area 2 sheltering a heating radiator 3 provided with two inlet and discharge connections 4 for a heat-carrying fluid which can be the coolant liquid of the thermal engine of the vehicle, as well as shutters for mixing 12 and for air distribution 13.

A rigid central ducting arrangement 5 exits the housing and opens toward the passenger space through an opening or central air discharge outlet 6. Rigid lateral ducting arrangments 7 open through openings or lateral air discharge outlets 8 situated in the side areas of the passenger space and rigid ducting arrangements 9 end in air discharge outlets 10 to discharge the air toward the windshield 11. Here outlets 10 are embodied in a single channel running along the base of the windshield. The combination of the outlets and the ducts forms a rigid assembly with the housing, and therefor forms a device which is a rigid and single block or unit in its entirety.

Figure 3:
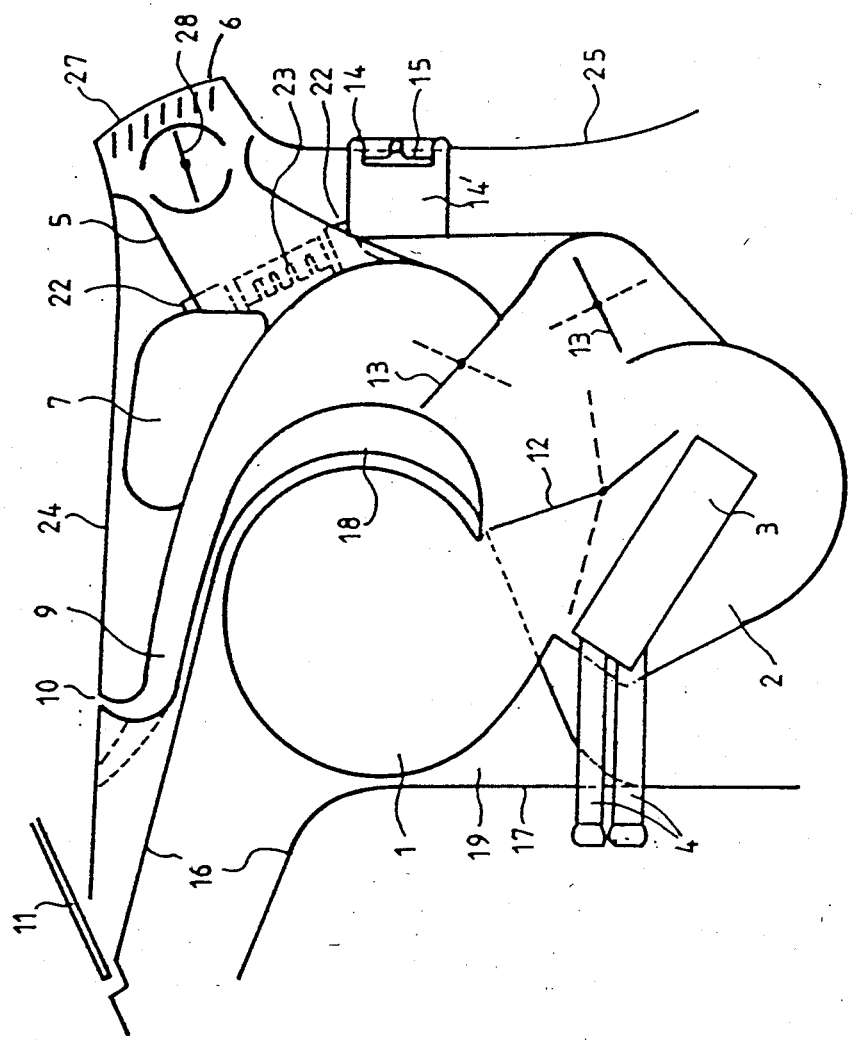
FIG. 3 is a diagrammatic view in cross section along the median longitudinal plane of the vehicle, showing one variation of the device of FIG. 1 and the vehicle elements adjacent to this device.

In a known manner, a pivoting mixing shutter 12 regulates the fraction of airflow being discharged from the fan which pases over radiator 3, and distribution shutters 13 control the inlet into the ducting arrangement leading toward the discharge outlets. In FIG. 3, shutters 12 and 13 are shown in full line in one of their end positions, and in broken lines in the other end position.

A control panel 14 with control buttons 15 is provided in order to control these various shutters. This control panel is placed and affixed in a support 14' provided in the facade of the device, in this case on the housing, and projects toward the passenger space in relation to the device.

The device is mounted by known means, not shown, on the partition 16 separating the passenger space and the engine compartment of the vehicle.

The device is provided with fixation elements 22 for the structural finishing elements, as well as connectors 23 for the control components and the dashboard instruments. The device can also support electric connection wires as well as any other elements which may be arranged on and/or in the vicinity of the device and/or structural finishing elements.

The fixation elements 22 and, more particularly, their parts 30 and 31 serve for fixation of the dashboard 24.

A lower median facade 25 is provided in addition to dashboard 24. The facade 25 is affixed on the device by means which are not shown to conceal the corresponding portion of the device, leaving only control panel 14 visible. Dashboard 24 presents openings 26 provided with grills covering lateral outlets 8 and an opening 27 provided with a grill covering central outlet 6. A closing shutter 28 is provided to cover each discharge outlet from member 24.

The arrangement may also be such that outlets 6 and 8 include grills and closing shutters, and that these grills, during assembly with the dashboard, come into alignment with the openings provided in the dashboard.

Also, as shown in FIG. 3, dashboard 24 includes an opening in alignment with channel 10, an opening which can be provided with a grill or not, as described previously for the outlets 6 and 8. Alternatively, channel 10 itself can be provided with a grill.

Connectors 23 are used for connection of the control installations, and/or the dashboard instruments such as the dashboard control panel and/or any other element which may be arranged on or in the vicinity of the device and/or the dashboard, such as, for instance, a lighting installation of a glove compartment.

Two connectors are provided in the example which is described, the connectors situated symmetrically in relation to each other and in relation to a median plane which is the plane of symmetry of the device. Thus, this arrangement allows for a conduit connection to be placed either to the right or to the left.

Also, the device according to the invention can be such that it does not necessarily provide the accessory function of support for other elements.

The invention may be applied both to an air conditioning installation and to a heating and ventilation installation, as described. For this purpose, an evaporator can be provided for instance downstream from the fan.

I claim:

1. For use in the assembly of a passenger vehicle having the normal components thereof including a passenger space, windshield and dashboard; an air control unit for installation of an air control system as a self-contained structure in the vehicle independent of the dashboard and in communication with the passenger space and windshield of the vehicle, said unit comprising a one-piece housing, air treatment components within said housing, a first series of outlets formed in and opening outward of said housing including a rigid central duct having a central outlet and laterally directed rigid ducts in communication with said central duct having outlets to each side of said central duct for air discharge into the passenger space, a second series of outlets formed in and opening outward of said housing and extending along said laterally directed ducts generally between said outlets to each side of said central duct and remote from said first series of outlets, said central and laterally directed ducts being integrally defined by said one-piece housing, said ducts communicating said air treatment components with each of said outlets, said housing, with the formed outlets and integrally defined ducts, being a rigid unit and mountable as a unit on the vehicle with the first series of outlets directed inward toward the passenger space and the second series of outlets directed toward the windshield.

2. The air control unit of claim 1 including mounting means on said housing for mounting components of the vehicle on said air control unit.

3. The air control unit of claim 1 including mounting means on said housing for mounting a vehicle dashboard thereon.

4. The air control unit of claim 3 including electric connectors mounted on said housing for selected engagement of vehicle electrical components therewith.

* * * * *